April 7, 1936.  C. M. TUTTLE ET AL  2,036,447
LIGHT REGULATING MEANS
Filed Jan. 19, 1929     3 Sheets-Sheet 1

INVENTORS
Clifton M. Tuttle
BY Fordyce E. Tuttle
ATTORNEY

April 7, 1936.  C. M. TUTTLE ET AL  2,036,447
LIGHT REGULATING MEANS
Filed Jan. 19, 1929  3 Sheets-Sheet 2

INVENTORS
Clifton M. Tuttle
BY Fordyce E. Tuttle
N. M. Perrins
ATTORNEY

April 7, 1936.  C. M. TUTTLE ET AL  2,036,447
LIGHT REGULATING MEANS
Filed Jan. 19, 1929    3 Sheets-Sheet 3

INVENTORS
Clifton M. Tuttle
BY Fordyce E. Tuttle
ATTORNEY

Patented Apr. 7, 1936

2,036,447

UNITED STATES PATENT OFFICE 2,036,447

LIGHT REGULATING MEANS

Clifton M. Tuttle and Fordyce E. Tuttle, Rochester, N. Y., assignors to Eastman Kodak Company, Rochester, N. Y., a corporation of New York Application January 19, 1929, Serial No. 333,540

8 Claims. (Cl. 179—100.3)

The present invention relates to arrangements for controlling the intensity of light and particularly the controlling of light intensity in connection with photography. Variation in light intensity is notably harmful in photography by artificial light, in the photographic printing or projection of still or motion pictures and in the photographic recording and reproduction of sound. Great difficulty has been encountered in photography or projection by artificial light operating on alternating current where the voltage changes during reversals of polarity result in changes of intensity of almost all light sources.

One object of the present invention, therefore, is to provide an arrangement in which the intensity of light does not fluctuate even when this light is derived from a lamp energized from a variable source of voltage. Another object of this invention is to provide means controlled by the voltage in the electric power line for mechanically correcting or compensating for variations in the light intensity due to variations in this power source. A further object of this invention is the provision of means whereby the effective size of an aperture through which the light is utilized may be selectively controlled in accordance with the variation in the power source so that all variations are properly equalized.

Figure 1:
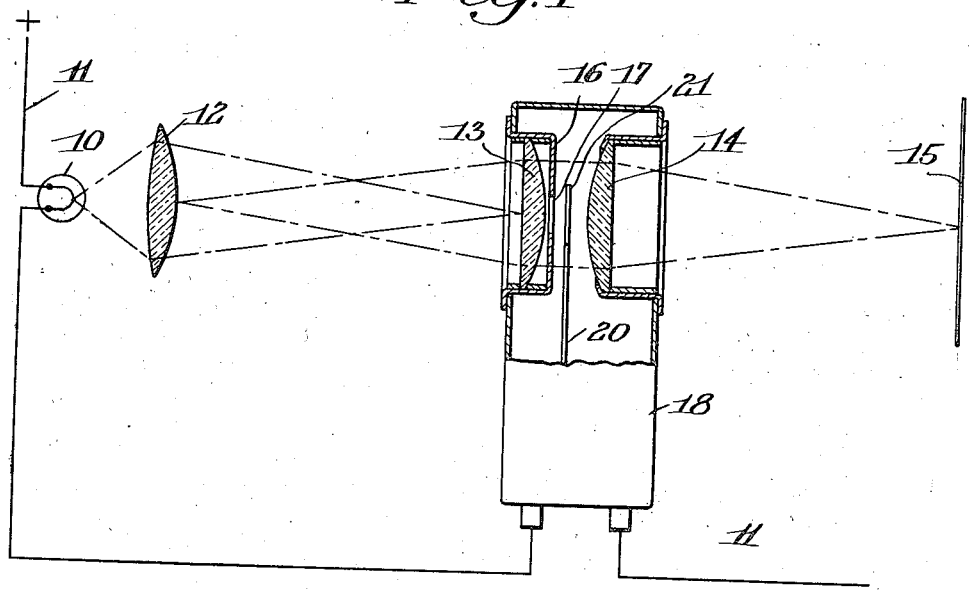
Figure 2:
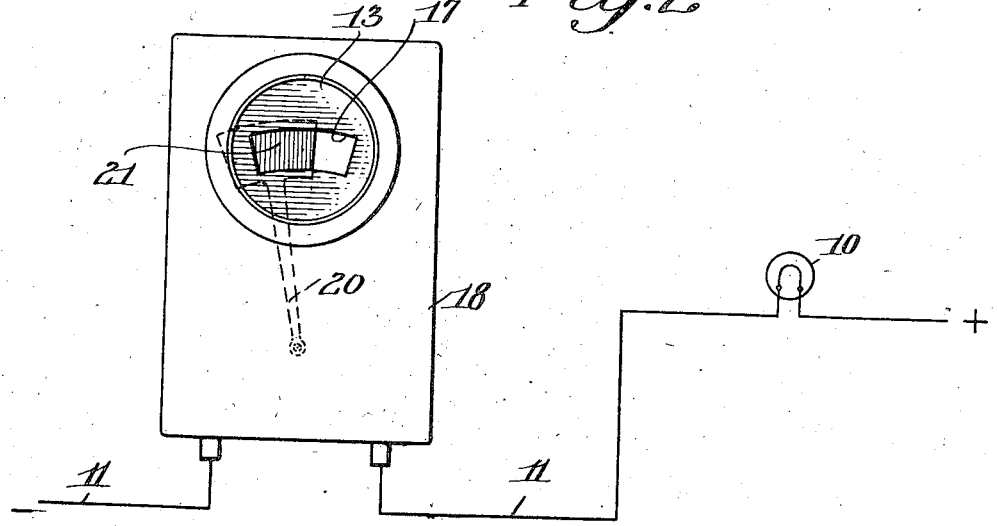
Figure 3:
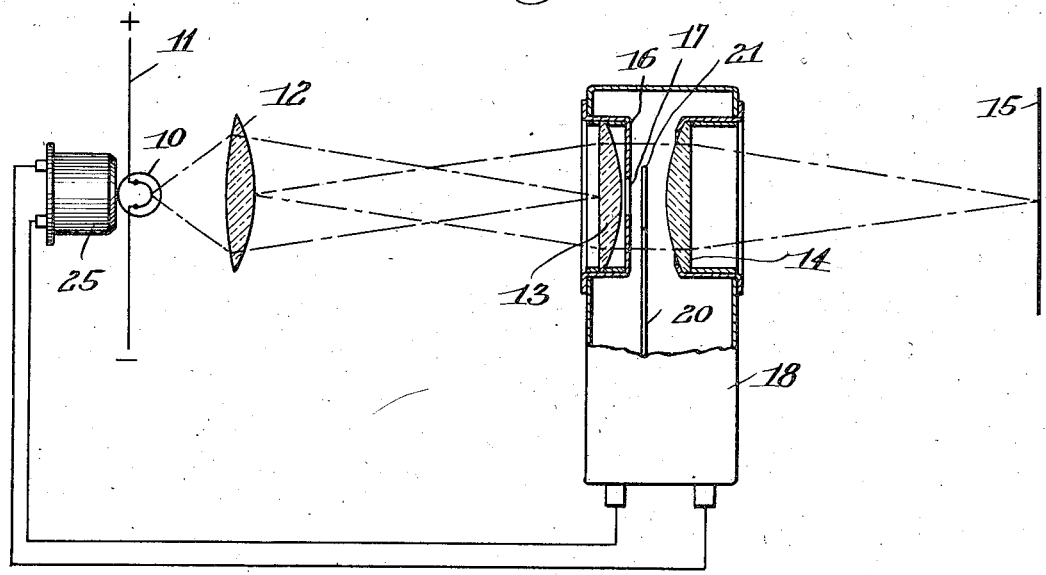
Figure 4:
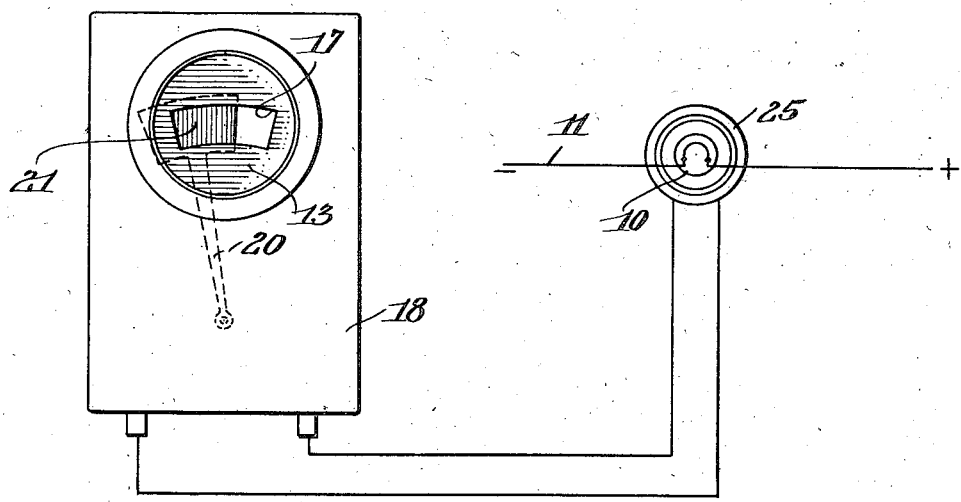
Figure 5:
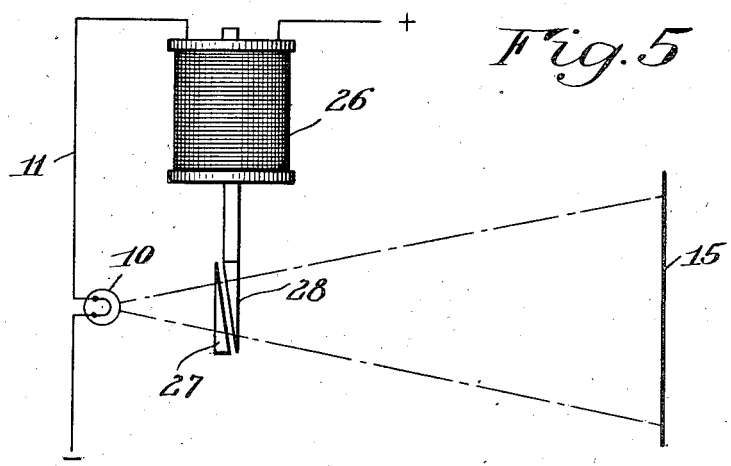
Figure 6:
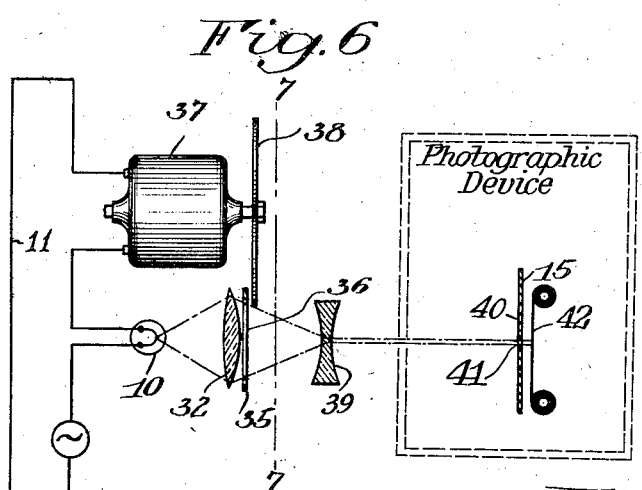
Figure 7:
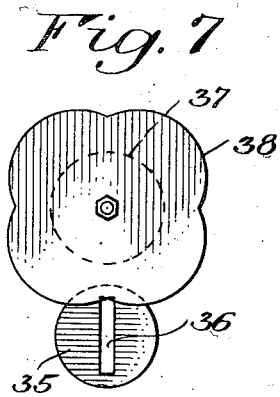
Figure 8:
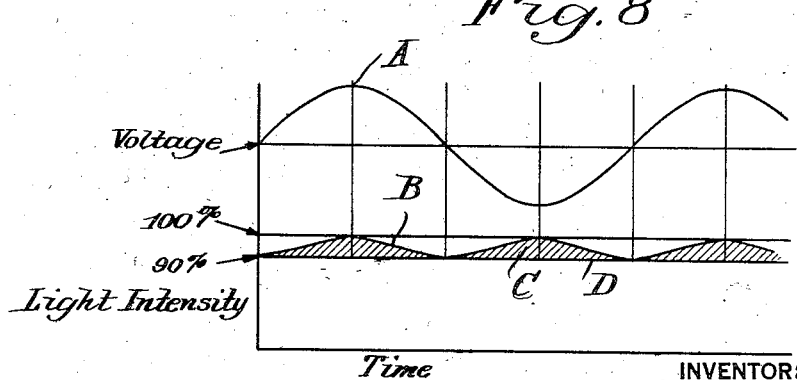

For a clearer understanding of the invention reference is made to the drawings in which Fig. 1 is a diagrammatic showing of a light intensity controlling system in which the light controlling element is shown partially in section while Fig. 2 shows a front view of this element; Fig. 3 is a diagrammatic showing of a modified form of the light controlling arrangement including a radiation responsive element electrically connected to a suitable meter the deflection of which provides a control of light intensity, the meter being shown partially in section while Fig. 4 is a diagrammatic view of this arrangement showing a front view of the light controlling equipment; Fig. 5 is a diagrammatic view of a further modified form of the invention in which solenoid control is employed; Figs. 6 and 7 show a still different modification employing a synchronous motor, Fig. 6 being a side elevation of the motor and controlling shutter with the diaphram broken away to show one side of the slit and Fig. 7 shows a front view of the controlling shutter and the diaphram through which the light passes; Fig. 8 is a graphic representation of the utilized light which is kept constant irrespective of the intrinsic brilliancy of the light source which varies with the reversals of polarity of the alternating current represented by a sinusoidal curve.

In the modification of the invention shown in Figs. 1 and 2, 10 designates a lamp or other suitable light source serially included in a conductor 11, the terminals of which are connected to an alternating or direct current power line across which there is a voltage variation. Light from this source 10 passes through an optical system having a condenser 12 and an objective including lens elements 13 and 14, to a plane 15 in which the light is to be used. It will be noted that a diaphragm 16, having an opening 17, is interposed in the path of the rays of light passing through the optical system. In order to control the variation in the light source due to variation in the line voltage, a commercial galvanometer 18, such as an ammeter, is included in the conductor 11 in series with a lamp 10. This galvanometer may be of any well-known type which actuates a needle or vane 20 in accordance with the variation in the line voltage which vane has an opaque shutter 21, a portion of which is visible through the opening 17 of diaphragm shown in Fig. 2. The shape of the shutter 21 or of the diaphragm opening or both is such that a variation of light intensity resulting from variations in line voltage either with the direct current or alternating current line, will be equalized or compensated so that the light reaching the plane 15 will be of constant intensity at all times.

Figs. 3 and 4 show a modified form of the invention differing from the arrangement shown in Figs. 1 and 2 in that the galvanometer 18 instead of being connected in series with the power line 11 is connected in series with a light responsive device 25 placed adjacent the electric light 10. The device 25 may be a thermocouple or a photoelectric cell or any device which may be utilized to measure variations in the intensity of radiation. In this arrangement when the intensity of light increases, the galvanometer is energized and moves its vane 20 and the attached shutter 21 toward the right in Fig. 4 thereby closing a greater portion of the opening 17 to reduce the amount of light that passes therethrough. When the intensity of light from the lamp 10 decreases, the deflection produced by the radiation responsive device 25 decreases and the vane 20 moves its shutter 21 to the left thereby permitting a greater amount of light to pass through the opening 17.

In the modification shown in Fig. 5, 10 designates a source of light in the form of an electric lamp which is connected with a source of varying voltage over conductor 11. The conductor 11 has serially included therein the winding of a solenoid 26 of the plunger type, the movable element or plunger of which carries an optical wedge mounted adjacent a fixed wedge 27 in such a manner that the light passing therethrough is equalized in response to variations in voltage so that the light from source 10, which reaches the plane surface 15, is always constant in intensity.

In Figs. 6 and 7 still another form of the invention is shown in which 10 represents an electric lamp energized from an alternating current source over the conductor 11. Light from this lamp passes through lenses 32 and 39 between which there is mounted a diaphragm 35 having an opening 36 therein, and thence to the plane in which it is to be utilized. A synchronous motor 37, actuated from the same source of power as that which energizes the lamp 10, has a diaphragm in the form of an irregularly shaped disc 38 (best shown in Fig. 7) mounted on its shaft which disc rotates past the slit 36 in the diaphragm.

While the light controlling arrangements of the present invention may be employed for various purposes it is indicated in Fig. 6 how one modification may be used with phonographic devices for the recording or reproduction of sound by means of a photographic record. In this figure a recording or reproducing device having a member 40 provided with a slit 41, adjacent a photographic record 42, may be incorporated within the broken line rectangle. Such phonographic devices may be of the type disclosed in Figs. 1 and 3 of the patent to H. C. Snook No. 1,681,376, granted August 21, 1928, wherein the present light controlling arrangement may be substituted for the lamps 19 and 26 together with the lenses such as 20, there shown.

Fig. 8 graphically shows the operation of the arrangement disclosed in Figs. 6 and 7. In this figure curve A represents the sinusoidal variation of voltage per unit of time in an alternating current supply while curve B represents the corresponding variation of intensity of light from a lamp energized from this alternating current supply. It will be understood that the disc 38 operates in phase with the voltage fluxuation and similarly in phase with the light intensity fluxuation and the shape of this disc is adjusted to cut off such area in the slit 36 that the variations in light intensity represented by the cross-hatched areas C in Fig. 8 will be cut off thus maintaining constant light intensity represented by the straight line D. While Fig. 8 is particularly applicable in describing the arrangement shown in Figs. 6 and 7 it will be helpful in understanding the operations of the other modifications if it is recognized that the voltage variations may or may not be of the character represented by the curve A.

By the term photographic record as used in the specification and claims hereof we mean either a sensitized element upon which an image may be made at the slit or an element bearing finished images which cause the reproduction of sound as they are moved past the slit.

It is to be understood that the described structures are examples and that we consider as included in our invention all such modifications and equivalents as fall within the scope of the appended claims.

What we claim as our invention is:

1. In an arrangement of the class described, a lamp for supplying a beam of utilized light, a source of varying electrical energy for energizin said lamp whereby the light therefrom varies in intensity, and means in circuit with and actuated solely and directly from said source of electrical energy for varying the intensity of the light supplying said beam of utilized light as an inverse function of the variations of said source of electrical energy whereby the intensity of said beam of utilized light is maintained substantially constant.

2. In an arrangement of the class described, a lamp, a source of varying electrical energy which energizes said lamp whereby the light therefrom varies in intensity, a diaphragm provided with an opening associated with said lamp, a shutter controlling the amount of light passing through said opening, and a synchronous motor operating from said source of varying electrical energy for controlling said shutter.

3. In an arrangement of the class described, a lamp, a source of varying electrical energy for energizing said lamp whereby the light therefrom varies in intensity, a diaphragm provided with an opening associated with said lamp, a shutter in the form of an irregularly shaped disc for controlling the amount of light passing through said opening, and a synchronous motor operated from said source of varying electrical energy for rotating said shutter past said opening.

4. In an arrangement of the class described, a lamp, a source of alternating current for energizing said lamp, a diaphragm provided with a slit associated with said lamp, a shutter in alignment with said slit, and a synchronous motor operating from said source and controlling the shutter, the shutter being so shaped and located with respect to the slit as to equalize the total light passing the slit and shutter and compensate for variations in brightness of the lamp due to the current alterations.

5. In an arrangement of the class described, a lamp, a source of alternating current for energizing said lamp, a diaphragm provided with a slit associated with said lamp, a shutter in the shape of an irregularly shaped disc and mounted to rotate with the edge thereof partially overlapping said slit, and a synchronous motor operated from said source and connected to the shutter to rotate the shutter.

6. In combination with a phonographic device employing a photographic record and having means provided with a slit past which said photographic record is moved, a lamp for illuminating said slit, a source of varying electrical energy for energizing said lamp whereby its intrinsic brilliancy varies, mechanical means for varying the intensity of the illumination on said slit, and automatic means actuated from said source of electrical energy for operating said mechanical means to keep the utilized light from said lamp at said slit constant, irrespective of its varying intrinsic brilliancy.

7. In combination with a phonographic device employing a photographic record and having means provided with a slit past which said photographic record is moved, a lamp for illuminating said slit, a source of constant voltage alternating current for energizing said lamp whereby the light therefrom varies in intensity, a diaphragm provided with an opening associated with said lamp, a shutter controlling the amount of light passing through said opening, and a synchronous motor operating from said source of electrical energy for controlling said shutter whereby the intensity of light passing through said opening to said slit is uniform.

8. In combination with a phonographic device employing a photographic record and having means provided with a slit past which said photographic record is moved, a lamp for illuminating said slit, a source of varying electrical energy for energizing said lamp whereby the light therefrom varies in intensity, a diaphragm provided with an opening associated with said lamp, a shutter in the form of an irregularly shaped disc for controlling the amount of light passing through said opening to said slit, and a synchronous motor operated from said source of varying electrical energy for rotating said shutter past said opening.

CLIFTON M. TUTTLE.
FORDYCE E. TUTTLE.